Dec. 21, 1954 W. J. CASEY III 2,697,498
BRAKE HEAD BALANCING DEVICE
Filed Feb. 6, 1952
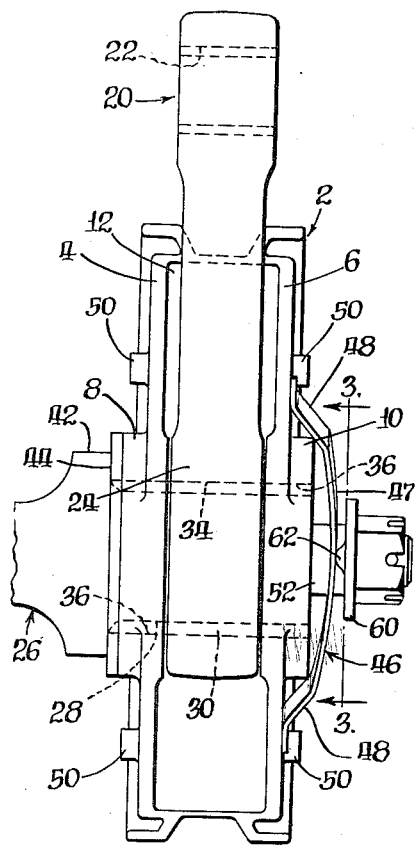
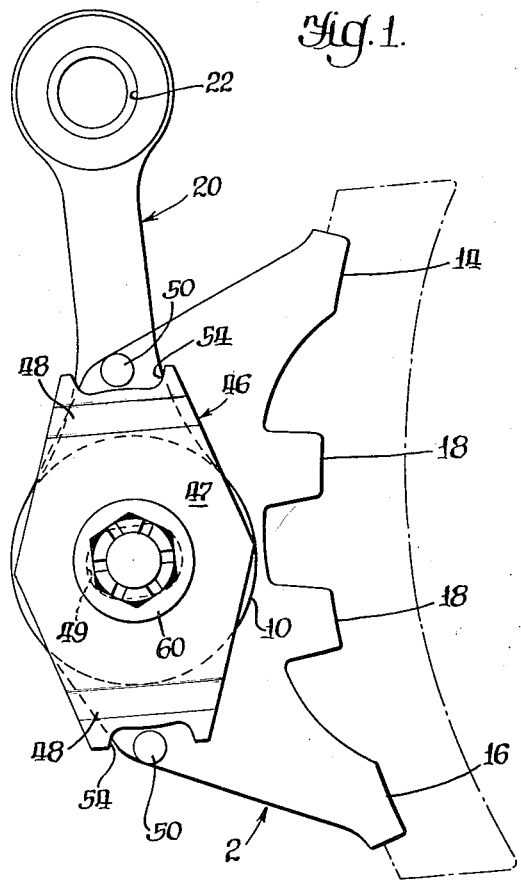
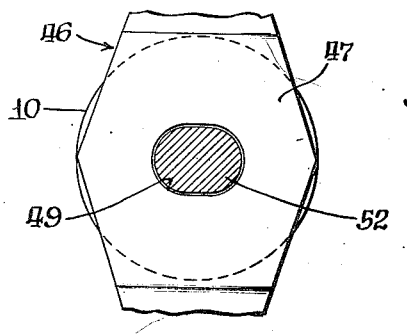
INVENTOR.
William J. Casey, III.
BY
Orrin O.B. Garner
Atty United States Patent Office 2,697,498
Patented Dec. 21, 1954

2,697,498

BRAKE HEAD BALANCING DEVICE

William J. Casey III, Chicago, Ill., assignor to American Steel Foundries, Chicago, Ill., a corporation of New Jersey Application February 6, 1952, Serial No. 270,223

4 Claims. (Cl. 188—206)

My invention relates to brake equipment and more particularly to a novel brake head mounting means.

An object of my invention is to provide novel means for mounting a brake head on an associated supporting member in such manner as to adjustably maintain or balance the brake head in properly operative relation to a braking surface.

A more specific object of my invention is to provide a brake head mounting and balancing arrangement comprising novel locking means for securing a brake head on a brake beam including means for frictionally resisting relative rotation of the same and for positively restricting said rotation within predetermined limits.

Another object of my invention is to utilize a nonrotatable spring plate to resiliently maintain a brake head in frictional engagement with a shoulder on an auxiliary brake beam.

The various novel features of my invention will be apparent from the following description and drawing, and will be particularly pointed out in the appended claims.

In the drawing:

Figure 1 is a side elevational view of an application of my invention;

Figure 2 is a rear elevational view taken from the left, as seen in Figure 1; and Figure 3 is a sectional view taken in the plane represented by line 3—3 of Figure 2.

In some of the views certain structural features have been omitted where such features are more clearly shown in other figures.

Describing the embodiment of my invention shown in Figures 1 and 2, the brake head generally designated 2 comprises spaced inboard and outboard walls 4 and 6 providing parallel bearing portions 8 and 10, respectively, said side walls having a transverse wall 12 extending therebetween and merging therewith. The transverse wall 12 also merges with the spaced end or toe lugs 14 and 16 (Figure 1), as well as the intermediate lugs 18, said lugs being formed and arranged for connection to an associated brake shoe in a conventional manner.

A brake hanger generally designated 20 is formed at its upper end with a bushed opening 22 affording a pivotal connection to a supporting frame member (not shown). The opposite end of said hanger 20 is provided with a bearing portion 24 extending between the spaced side walls 4 and 6 of the brake head.

The brake beam, generally designated 26, is provided with a trunnion 28 on which may be tightly fitted, as by press fit, a bushing 30. The trunnion extends through aligned openings in the brake head bearing portions 8 and 10 and the hanger bearing portion 24, with the bushing 30 on said trunnion in rotatable bearing engagement with the bearing portion 24 as at 34 and as at 36 with the bearing portions 8 and 10 of the brake head.

The side wall 4 of the brake head 2 abuts and frictionally engages as at 44 the annular shoulder 42 formed on the brake beam adjacent the trunnion 28.

Each wall 4 and 6 of the brake head 2 has formed thereon circular bosses or pins 50, each boss being equally spaced from the pivotal axis of the brake head 2.

A lug or outstanding portion 52 having an elliptical contour is formed on the brake beam 26 outboard of the trunnion 28.

The center portion 47 of the spring plate 46 has formed therein a nonround opening, such as an elliptical hole or cut out 49 which is in complementary engagement with the like periphery of the lug 52. The spring plate 46 also has the opposed distended arms 48. Each arm abuts the wall 6 and has a recess or aperture 54 loosely receiving the adjacent lug 50 of the brake head 2.

It is to be noted that each wall 4 and 6 of the brake head 2 has formed thereon the mentioned lugs 50 thus permitting assembly of the brake head to either end of the brake beam 26.

Elastic force is induced and maintained in the spring plate 46 by means of a washer 60 having a plurality of nubs 62 in central pressured engagement with the spring plate 46. The assembly is locked in position by the conventional slotted nut and pin arrangement, as illustrated.

In operation, the pressure of the spring bar 46 urging the brake head 2 into frictional engagement with the shoulder 42 is operative to resist rotation of the brake head around the trunnion 28. The undesired rotation is also positively limited by the recesses 54 on the nonrotatable spring plate 46 engaging the lugs 50 of the brake head 2.

It is to be noted that the cut outs 54 may be of any desired form, such as slots, holes or the like.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a brake arrangement, a brake beam, a trunnion portion on said beam, an annular flange defining a limit of said trunnion portion, a lug of approximately elliptical periphery on said portion and spaced from said flange, a brake head having spaced parallel walls, a pair of spaced circular bosses extending outwardly from each of said walls, said brake head having a pivot hole embracing said trunnion portion intermediate said bosses, a hanger received between said walls and pivotally connected to said trunnion portion, a resilient plate having a centrally located substantially elliptical hole in complementary engagement with said lug and abutting one of said walls at spaced points, a pair of slots on said plate each receiving one of said bosses, and means to retain elastic stresses in said plate so constructed and arranged that the brake head is urged into frictional engagement with the annular flange.

2. In a brake head balancing arrangement, a beam, a shoulder on said beam, a pivotal portion adjacent said shoulder, a brake head mounted on said pivotal portion, a noncircular member secured to said pivotal portion, a spring bar fixedly embracing said member outboardly of the brake head, distended elements formed on said spring bar and arranged to elastically position said head in frictional engagement with said shoulder.

3. In a brake head mounting arrangement, a beam, a shoulder on said beam, a cylindrical portion adjacent said shoulder, a noncircular lug on said portion, a brake head rotatably mounted on said portion, lugs on said brake head equally spaced from the axis of said cylinder portion, a spring plate having complementary engagement with the noncircular lug, arms on said spring plate engaging said brake head at points equally spaced from the axis of said cylindrical portion and having recesses therein for receiving said lugs, and induction means to stress said spring whereby the brake head is urged to frictionally engage the shoulder.

4. A brake head mounting, according to claim 3, wherein the induction means consists of a plurality of nubs having pressured engagement with said spring plate at a point intermediate said arms.

References Cited in the file of this patent

UNITED STATES PATENTS

| Number | Name | Date |
|---|---|---|
| 1,064,710 | Christianson | June 17, 1913 |
| 1,199,869 | Burton | Oct. 3, 1916 |
| 1,199,871 | Burton | Oct. 3, 1916 |
| 1,199,872 | Burton | Oct. 3, 1916 |
| 2,281,535 | Drews | Apr. 28, 1942 |
| 2,507,062 | Tack | May 9, 1950 |